(12) United States Patent
Monaghan et al.

(10) Patent No.: US 11,645,824 B1
(45) Date of Patent: May 9, 2023

(54) SYSTEMS AND METHODS FOR DEFINING, BONDING, AND EDITING POINT CLOUD DATA POINTS WITH PRIMITIVES

(71) Applicant: Illuscio, Inc., Culver City, CA (US)

(72) Inventors: Robert Monaghan, Ventura, CA (US); Tim Sung, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/935,665

(22) Filed: Sep. 27, 2022

Related U.S. Application Data

(63) Continuation of application No. 17/700,927, filed on Mar. 22, 2022, now Pat. No. 11,455,789, and a continuation of application No. 17/700,760, filed on Mar. 22, 2022, now Pat. No. 11,461,987.

(51) Int. Cl.
*G06T 19/20* (2011.01)
*G06T 15/50* (2011.01)

(52) U.S. Cl.
CPC .............. *G06T 19/20* (2013.01); *G06T 15/50* (2013.01); *G06T 2210/56* (2013.01); *G06T 2219/2012* (2013.01); *G06T 2219/2016* (2013.01)

(58) Field of Classification Search
CPC ..... G06T 19/20; G06T 15/50; G06T 2210/56; G06T 2219/2012; G06T 2219/2016
See application file for complete search history.

(56) References Cited

U.S. PATENT DOCUMENTS

| | | | |
|---|---|---|---|
| 7,995,055 B1 | 8/2011 | Ma et al. | |
| 8,831,366 B1 | 9/2014 | Hickman et al. | |
| 9,245,170 B1* | 1/2016 | Nikic | G01S 7/003 |
| 10,018,711 B1 | 7/2018 | Sebastian et al. | |
| 10,346,998 B1 | 7/2019 | Anderberg et al. | |
| 2013/0126595 A1* | 5/2013 | Ashford | G06Q 50/30 |
| | | | 235/375 |
| 2015/0134303 A1* | 5/2015 | Chang | G01B 11/24 |
| | | | 703/1 |
| 2016/0154999 A1 | 6/2016 | Fan et al. | |
| 2016/0180195 A1 | 6/2016 | Martinson et al. | |
| 2018/0247447 A1 | 8/2018 | Sema et al. | |
| 2018/0313956 A1 | 11/2018 | Rzeszutek et al. | |
| 2019/0087978 A1 | 3/2019 | Tourapis et al. | |
| 2021/0073345 A1 | 3/2021 | St. Romain, Ii et al. | |

* cited by examiner

*Primary Examiner* — Said Broome
(74) *Attorney, Agent, or Firm* — Ansari Katiraei LLP; Arman Katiraei; Sadiq Ansari (57) ABSTRACT

Disclosed are systems and methods for defining, bonding, and editing point cloud data points with primitives. In particular, a system may receive a point cloud with data points that are defined by positional and non-positional elements. The system may associate primitives to each data point based on a material or a property associated with the surface, feature, or article at a position in an imaged three-dimensional ("3D") environment that corresponds to a particular position of the data point in the point cloud. The system may receive input for a first adjustment to at least one of the data point elements, and may edit point cloud by defining a second adjustment that modifies the first adjustment according to a rule of a particular primitive, and by applying the second adjustment to the at least one element of a first set of data points that are associated with the particular primitive.

20 Claims, 9 Drawing Sheets

SYSTEMS AND METHODS FOR DEFINING, BONDING, AND EDITING POINT CLOUD DATA POINTS WITH PRIMITIVES

CLAIM OF BENEFIT TO RELATED APPLICATIONS

This application is a continuation of U.S. nonprovisional application Ser. No. 17/700,760 entitled "Systems and Methods for Defining, Bonding, and Editing Point Cloud Data Points with Primitives", filed Mar. 22, 2022 and issued as U.S. Pat. No. 11,461,987, and is also a continuation of U.S. nonprovisional application Ser. No. 17/700,927 entitled "Systems and Methods for Dynamically Classifying Point Cloud Data Points", filed Mar. 22, 2022 and issued as U.S. Pat. No. 11,455,789. The contents of application Ser. Nos. 17/700,760 and 17/700,927 are hereby incorporated by reference.

BACKGROUND

A point cloud may represent a three-dimensional ("3D") object or environment with millions or billions of data points. Each data point may capture the positioning and other characteristics of a different surface, feature, or article from the 3D object or environment at a corresponding point in space.

Rendering the point cloud may include rendering each data point separately to produce a visualization of the 3D object or environment. More specifically, rendering the point cloud may include processing the positional information and each stored characteristic for each data point separately in order to generate the visualization. Accordingly, any editing or rendering of the point cloud may take significant amounts of time and processing power, thereby hindering the user experience and slowing the adoption of point clouds for imaging and other purposes.

DETAILED DESCRIPTION OF PREFERRED EMBODIMENTS

The following detailed description refers to the accompanying drawings. The same reference numbers in different drawings may identify the same or similar elements.

Provided are systems and methods for defining, bonding, and editing point cloud data points with primitives. The primitives may include new descriptive elements that are added to one or more of the point cloud data points. The primitives may be used to define properties of a data point that may not be directly captured with a point cloud capture device or that may not be measured with numerical values.

In some embodiments, a primitive may reduce the size and processing effort required to manipulate and/or render a point cloud by acting as a substitute that replaces two or more positional or descriptive elements of the data points. Accordingly, a single primitive may be processed in place of the two or more positional or descriptive elements that the single primitive represents.

In some embodiments, a primitive may be associated with one or more rules that change how that primitive or data points defined with that primitive are processed. For instance, the rules may specify how adjustments may apply differently to data points that are defined with different primitives.

In some embodiments, an adjustment for a particular primitive may be computed once, and may be applied to all data points defined with that same particular primitive. In some embodiments, non-geometric bonds may be created between data points that are defined with the same one or more primitives. The data points that are bonded by one or more primitives may be processed, edited, and/or otherwise manipulated together.

Figure 1:
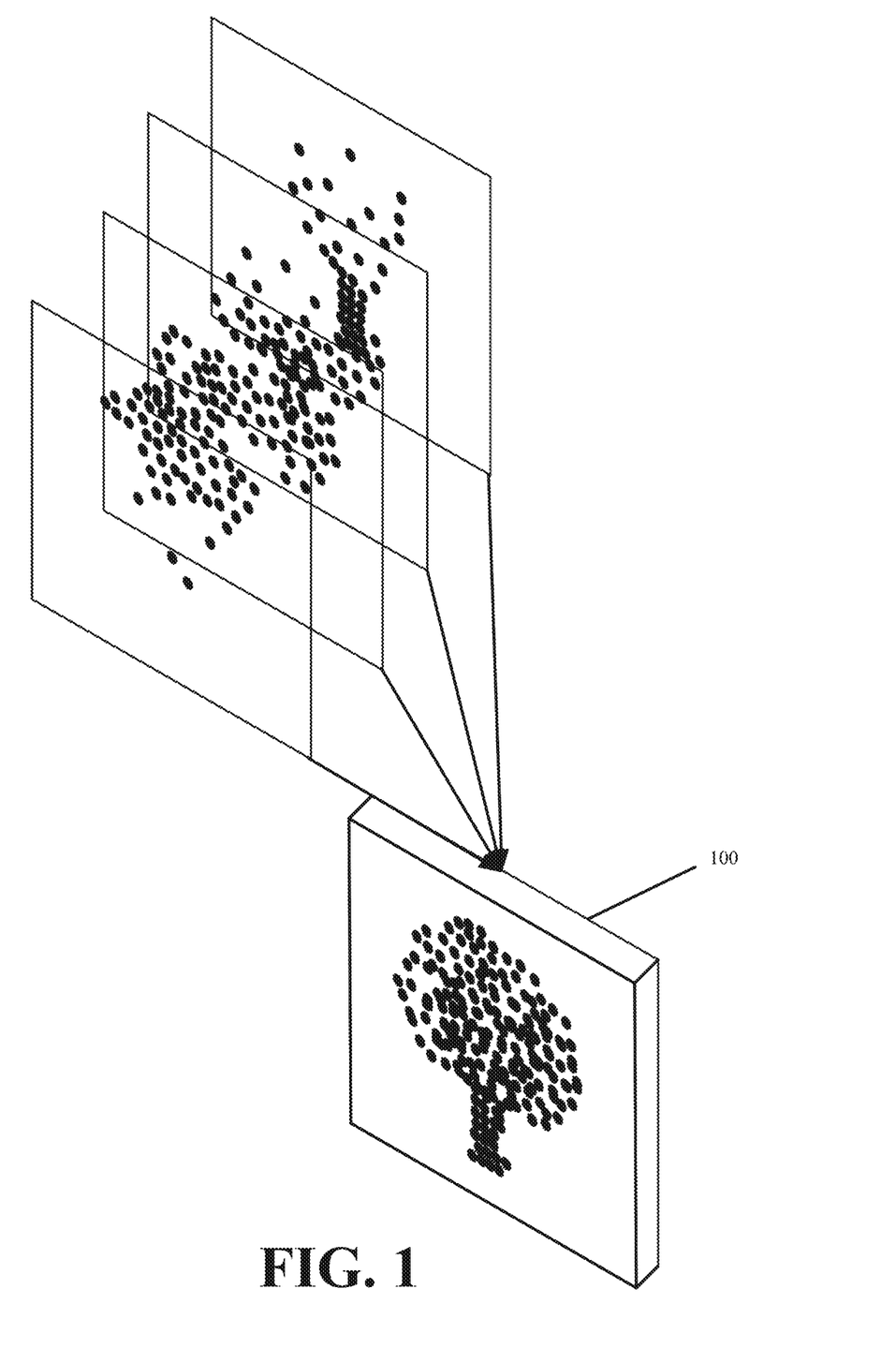
FIG. 1 illustrates an example point cloud that represents a 3D object or 3D environment using data points with different characteristics at different 3D positions.

A point cloud may include a set of data points for representing a three-dimensional ("3D") or volumetric object or environment. FIG. 1 illustrates an example point cloud 100 that represents a 3D object or 3D environment using data points with different characteristics at different 3D positions.

The point cloud data points may differ from pixels of a two-dimensional ("2D") image, because certain regions of point cloud 100 may have no data points, lower densities of data points, and/or higher densities of data points based on varying amounts of visual information that is detected at those regions. In contrast, pixels of a 2D image have a uniform density and fixed arrangement that is defined by the resolution of the 2D image. In other words, the point cloud data points may have a non-uniform placement or positioning, whereas the 2D image has pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of an imaged surface, feature, or article of the 3D object in 3D space.

The non-positional elements may include information about the detected characteristics of the surface, feature, or article imaged at a corresponding position in 3D space. The characteristics may correspond to a detected color. The color may be represented using red, green, blue ("RGB"), and/or other values. In some embodiments, the characteristics may provide the chrominance and/or luminance of the imaged surface, feature, or article. In some embodiments, the characteristics may be related to properties of the device used to generate each of data points. For instance, the characteristics may include a Tesla strength value to quantify the strength of the magnetic field that was used in detecting and/or imaging the surface, feature, or article represented by a particular point cloud data point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding data point in 3D space.

Each point cloud data point may include an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, red, green, blue, chrominance, luminance, tesla, and/or other values.

Point cloud 100 and the individual data points of point cloud 100 may be generated by a 3D or depth-sensing camera, Light Detection and Ranging ("LiDAR") sensor, Magnetic Resonance Imaging ("MM") device, Positron Emission Tomography ("PET") scanning device, Computerized Tomography ("CT") scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each data point in 3D space, and a second imaging device (e.g., a high-resolution camera) may measure or capture the characteristics or other non-positional information for each data point.

Figure 2:
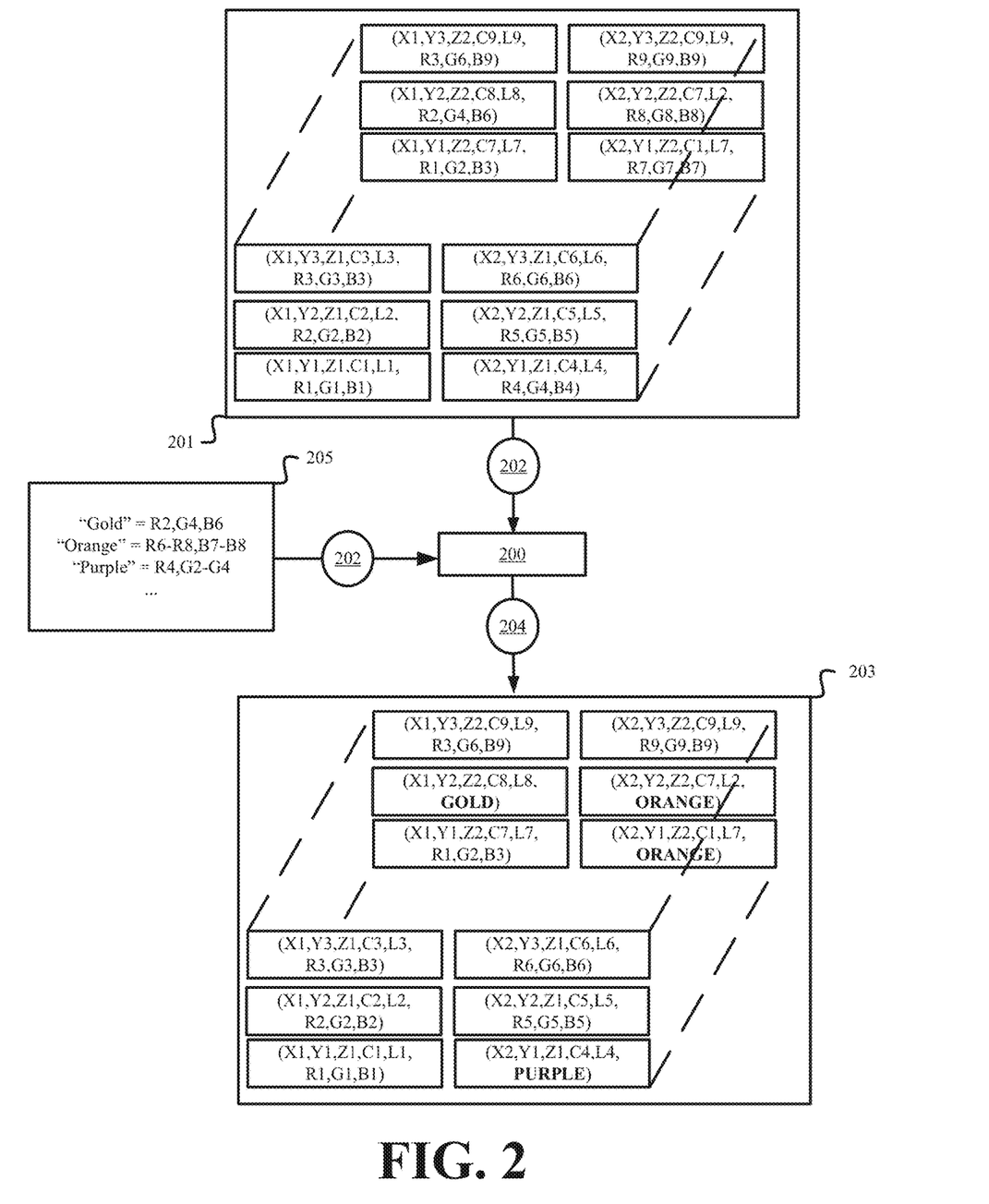
FIG. 2 illustrates an example of reducing the size of a point cloud by substituting two or more data point elements with different primitives in accordance with some embodiments presented herein.

FIG. 2 illustrates an example of reducing the size of a point cloud by substituting two or more data point elements with different primitives in accordance with some embodiments presented herein. Point cloud system 200 may receive (at 202) point cloud 201, and may generate compressed point cloud 203 by replacing (at 204) two or more RGB descriptive elements within some of the data points with a single color primitive using primitive definition 205.

In some embodiments, primitive definition 205 may define different color primitives and may map the color primitives to two or more RGB descriptive elements that may be replaced by those color primitives. In some embodiments, a color primitive may directly map to two or more RGB values. In some other embodiments, a color primitive may map to a range of two or more RGB values. For instance, the color primitive "gold" may map to data points with a specific red color value, green color value, and blue color value, and the color primitive "orange" may map to data points with red color values in a first range and blue color values in a second range.

Consequently, point cloud 203 may be smaller in size relative to point cloud 201 despite point clouds 203 and 201 containing the same data and producing the same visualization when rendered. In some embodiments, the primitives may also reduce the load associated with processing and/or manipulating a point cloud data. For instance, point cloud system 200 may select a set of data points that are defined with a particular color primitive based on a single search for that particular color primitive in point cloud 203. The selection of the same set of data points in point cloud 201 may require a separate search on each of the two or more RGB values represented by that same particular color primitive.

In some embodiments, the primitive definition may associate different rules with different primitives. The rules may cause the same adjustment to be applied differently to data points with different primitives. Stated differently, the rules may define different impacts that edits and/or changes have on data points that are defined with different primitives.

Figure 3:
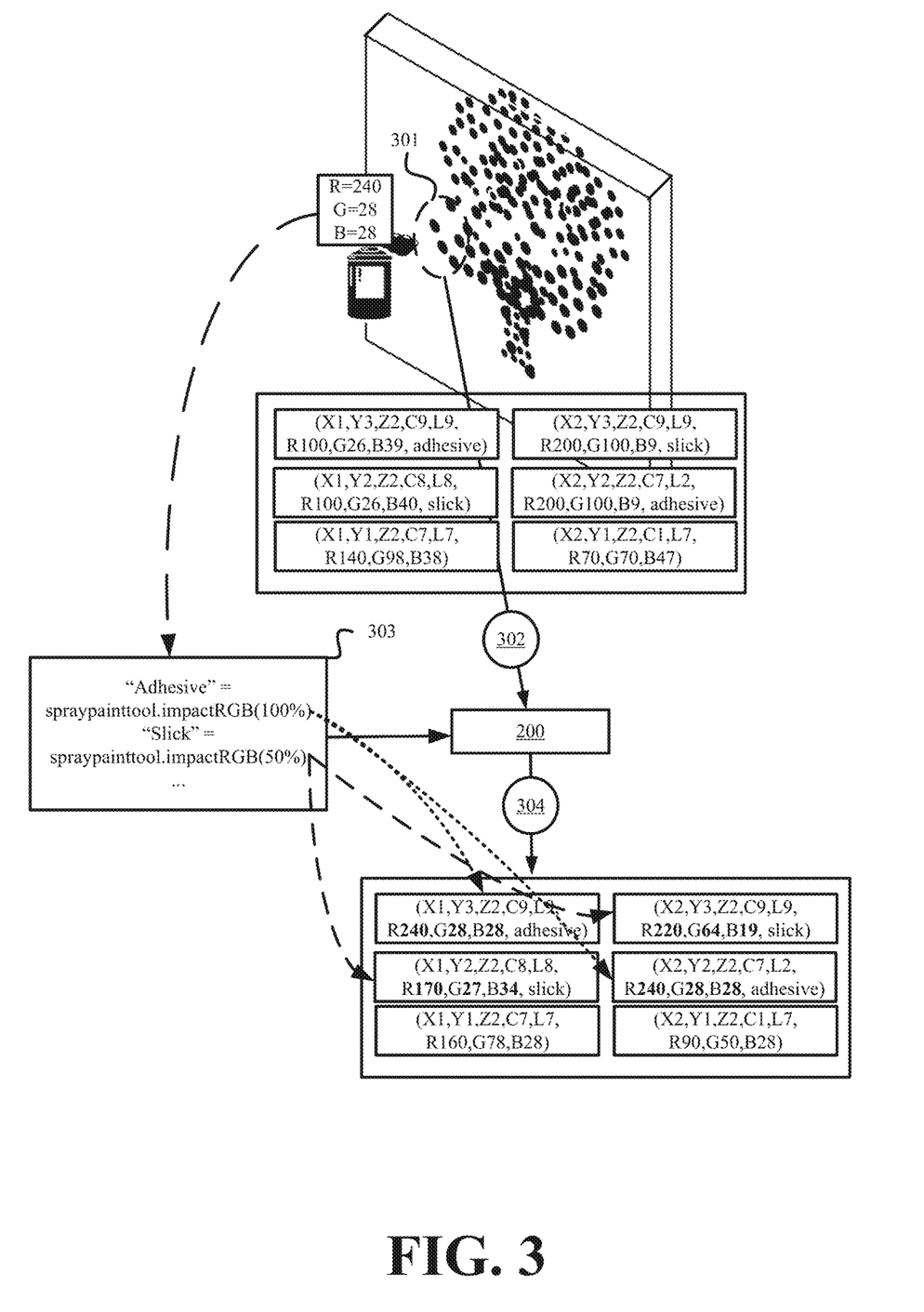
FIG. 3 illustrates an example for modifying an adjustment that is applied to different data points based on rules that are defined for different primitives of the data points in accordance with some embodiments presented herein.

FIG. 3 illustrates an example for modifying an adjustment that is applied to different data points based on rules that are defined for different primitives of the data points in accordance with some embodiments presented herein. Point cloud system 200 may receive (at 302) input from an editing tool (e.g., a spray paint tool or a paintbrush tool) to adjust the coloring of data points 301 in the path of the editing tool.

Without the primitives and the associated rules to modify the impact of the color adjustment, point cloud system 200 may apply the color adjustment equally to all the data points in the path of the editing tool. For instance, the editing tool may include a tool for changing the color of the affected data points to a specific red color regardless of the current color of the affected data points.

As shown in FIG. 3, primitive definition 303 may include rules that are associated with different primitives and that adjust the impact that the editing tool and/or the color adjustment has on the affected data points defined with the different primitives. For instance, primitive definition 303 may include a first rule for an "adhesive" primitive, and a second rule for a "slick" primitive.

The first rule may specify changing the RGB values of data points with the adhesive primitive to the RGB values of the color selected for the editing tool. For example, the first rule may specify a 100% change to the color selected for the editing tool.

The second rule may specify a partial change from the RGB values of data points with the slick primitive to the RGB values of the color selected for the editing tool. For example, the second rule may specify a 50% change to the color selected for the editing tool, wherein the 50% change may include adjusting to the average or median value between the current RGB values of the affected data points with the slick primitive and the RGB values for the color selected for the editing tool.

Accordingly, point cloud system 200 may apply (at 304) the color adjustment differently to the data points that are defined with the different primitives based on the different rules associated with the primitives in primitive definition 303. A default rule may be used to control the impact of the color adjustment on the data points that are not defined with any primitives or that do not have any custom rules associated with a defined primitive.

The rules may be defined relative to any one or more positional or descriptive elements of the affected data points. Stated differently, the rules may apply to one or more positional or descriptive elements of the affected data points, and each rule defined for a different primitive may specify different changes or a different impact to the one or more positional or descriptive elements. In some embodiments, the changes or impacts may be specified using Boolean true (e.g., yes) or false (e.g., no) values or with different proportionality expressed as percentages, numerical values, mathematical formulas, equations, etc.

In some embodiments, the primitives may be defined as different materials. For instance, the primitives in the primitive definition may include materials such as wood, plastic, ceramic, metal, etc. Each material may be associated with different material properties. For instance, the material properties may specify the magnetism, strength, rigidity (e.g., softness or hardness), viscosity, stickiness, weight, reflectivity, gravitational affects, and/or other visible and non-visible attributes of a specified material. Rules may be defined relative to the material or to a specific material property, and may specify the impact that an applied change or adjustment has to the positional and non-positional or descriptive elements of a data point defined with a particular material primitive and/or that is associated with a particular material property. For instance, a rule may be defined for the reflective material property of a particular material and may control how a data point defined with particular material reacts to light (e.g., how to render that data point in response to different amounts of light), a rule may be defined for the stickiness material property of the particular material to control how much color the data point defined with particular material absorbs, and a rule may be defined for the rigidity material property to control the displacement of the data point in response to an applied force or impact.

A user may use an application, Application Programming Interface ("API"), command, instruction, and/or other tools to manually or programmatically apply different changes or adjustments to the data points, materials represented by the primitives, and/or the material properties associated with a material. The changes that may be applied may include different forces (e.g., gravitational, electromagnetic, applied, spring, etc.), pressures, color, light, brightness, movement, temperature, sound, and/or other manual or programmatic changes.

In some embodiments, the definition of the primitives and the associated rules in the primitive definition may be manually provided or may be automatically determined via artificial intelligence and/or machine learning techniques ("AI/ML"). For instance, an AI/ML classifier may receive images or videos of different materials (e.g., glass, wood, ceramic, plastic, metal, etc.) with labels that identify the materials or material properties. The AI/ML classifier may analyze the images or videos, and may generate models for the reactivity of the materials or material properties to different forces, pressures, colors, light, movement, temperature, sound, and/or other changes. The AI/ML classifier may generate rules for the primitives based on the trained models, and the rules may include mathematical formulas, numerical values, percentages, and/or other expressions to specify the different reactivity that the different materials or material properties have to the different changes.

In some embodiments, the primitives may be manually associated with different point cloud data points. For instance, a system may generate a visualization or image based on the positional and non-positional elements of the point cloud data points, and a user may use a selection tool to select different regions within the visualization or image and to assign a primitive or material property to the set of data points in the selected region.

In some embodiments, the primitives may be programmatically associated with different point cloud data points. In some such embodiments, the primitive definition may include primitives that are defined relative to values of two or more data point elements. For instance, the primitive definition may specify adding the "Gold" primitive to data points that have red color values in a first range, green color values in a second range, and blue color values in a third range. Similarly, the primitive definition may specify adding the "Wood" primitive to data points that have chrominance values in a first range, red color values in a second range, and green color values in a third range.

In some embodiments, the primitives may be automatically assigned to the point cloud data points by a device that is used to create the point cloud data points. In some such embodiments, the device may identify the spectral properties of each detected surface, feature, or article that is represented by a point cloud data point, the spectral properties may map to different materials defined in the primitive definition as different primitives, and the primitives may be assigned to the data points based on the mapping.

Figure 4:
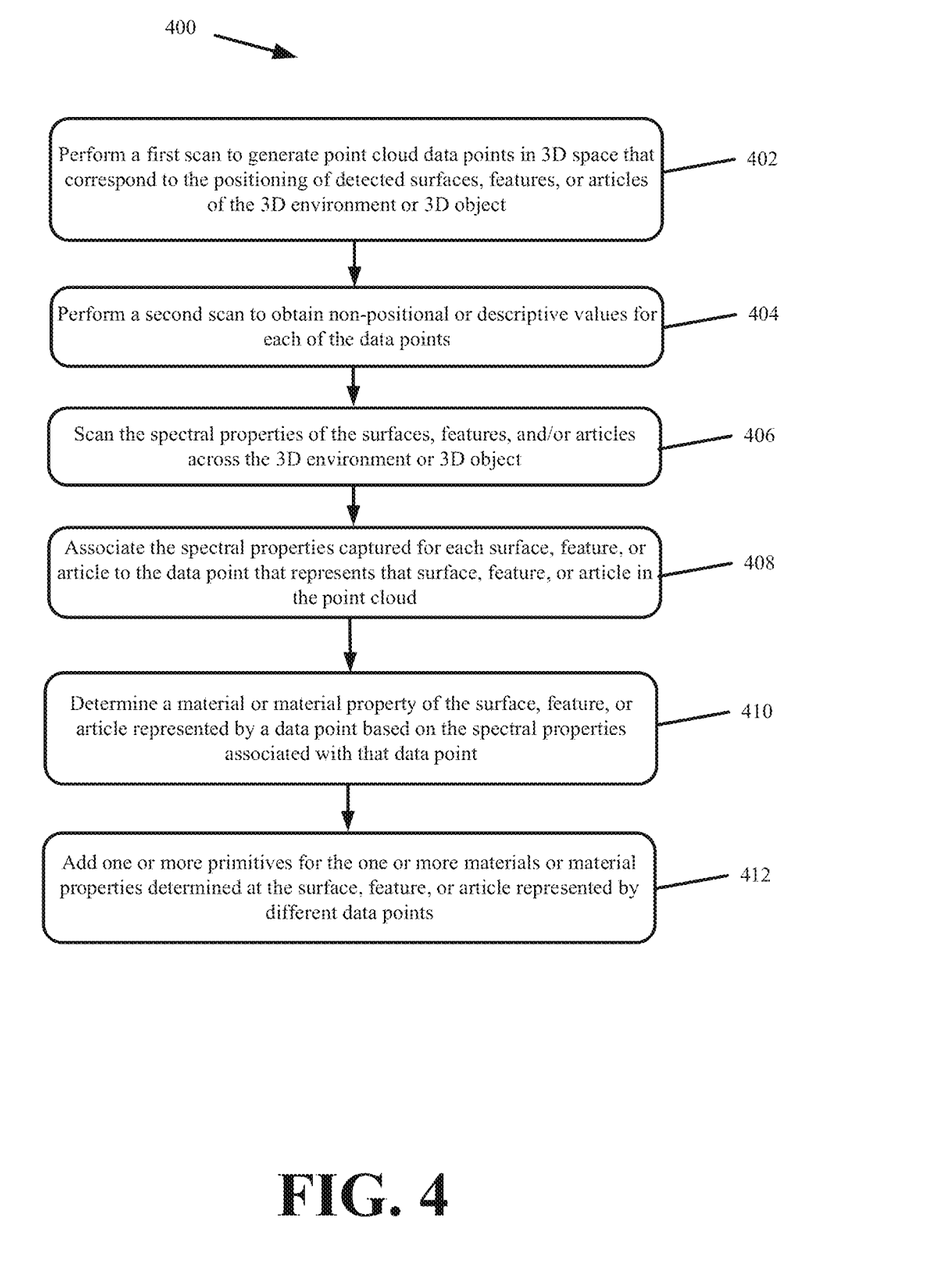
FIG. 4 presents a process for generating point cloud data points with primitives for the materials determined from scanning a 3D environment or 3D object in accordance with some embodiments presented herein.

FIG. 4 presents a process 400 for generating point cloud data points with primitives for the materials determined from scanning a 3D environment or 3D object in accordance with some embodiments presented herein. Process 400 may be implemented by point cloud system 200 that is coupled to one or more scanning and/or imaging devices for creating a point cloud representation of the 3D environment or 3D object. For instance, the scanning devices may include one or more of a Lidar, visible light, and spectral imaging devices.

Process 400 may include performing (at 402) a first scan to generate point cloud data points in 3D space that correspond to the positioning of detected surfaces, features, or articles of the 3D environment or 3D object. In other words, the first scan may generate the point cloud data points with positional elements and values.

Process 400 may include performing (at 404) a second scan to obtain non-positional or descriptive values for each of the data points. For instance, a visible light camera may capture the colors, reflectivity, and/or other descriptive characteristics across the 3D environment or 3D object, and may define the non-positional or descriptive elements of each data point based on the colors, reflectivity, and/or other descriptive characteristics detected at the exact position in the 3D environment or 3D object represented by each data point.

Process 400 may include scanning (at 406) spectral properties of the surfaces, features, and/or articles across the 3D environment or 3D object. In some embodiments, the scanning (at 406) of the spectral properties may be performed as part of the second scan to obtain the non-positional or descriptive values for the data points. In some embodiments, the scanning (at 406) of the spectral properties may be performed separate from the second scan and by using a different imaging device such as a slit spectroscope or other devices that produce spectral photography.

The spectral properties may include measurements of different bands from the electromagnetic spectrum that reflect off of each surface, feature, or article of the 3D environment or 3D object. The bands may include wavelengths in the visible, infrared, ultraviolet, x-rays, etc. Process 400 may include associating (at 408) the spectral properties captured for each surface, feature, or article to the data point that represents that surface, feature, or article in the point cloud.

Process 400 may include determining (at 410) a material or material property of the surface, feature, or article represented by a data point based on the spectral properties associated with that data point. In some embodiments, point cloud system 200 may be configured with a mapping between different spectral properties and different materials that have been defined as primitives in the primitive definition for the point cloud being generated. For instance, wood may be a first material that is defined as a first primitive and that may be mapped to a first set of spectral properties, ceramic may be a second material that is defined as a second primitive and that may be mapped to a different second set of spectral properties, and metal may be a third material that is defined as third primitive and that may be mapped to a different third set of spectral properties. More specifically, wood may reflect a first range of spectral bands from the electromagnetic spectrum (e.g., the first set of spectral properties), ceramic may reflect a second range of spectral bands from the electromagnetic spectrum (e.g., the second set of spectral properties), and metal may reflect a third range of spectral bands from the electromagnetic spectrum (e.g., the third set of spectral properties). The determination (at 410) of the material or material property may be based on the configured mapping between the reflected ranges of spectral bands and the materials or material properties within the primitive definition.

Process 400 may include adding (at 412) one or more primitives from the primitive definition for the one or more materials or material properties determined (at 410) at the surface, feature, or article represented by different data points. Some of the point cloud data points may have one or more primitives defined as a non-positional element, and some of the point cloud data points may have no primitives defined as a non-positional element. For instance, a first data point may be classified with a "metal" material type or primitive and also a "matte" material type or primitive, a second data point may be classified with a "metal" material type or primitive and also a "reflective" material type or primitive, and a third data point may include values for x, y, and z positional elements, RGB non-positional elements, and no primitives when the third data point represents a background or part of a sky that is not associated with any materials defined in the primitive definition.

As noted above, each of the primitives may be associated with one or more rules in the primitive definition. The rules associated with a particular primitive may control how a data point defined with that particular primitive is impacted by different changes introduced manually or programmatically.

Figure 5:
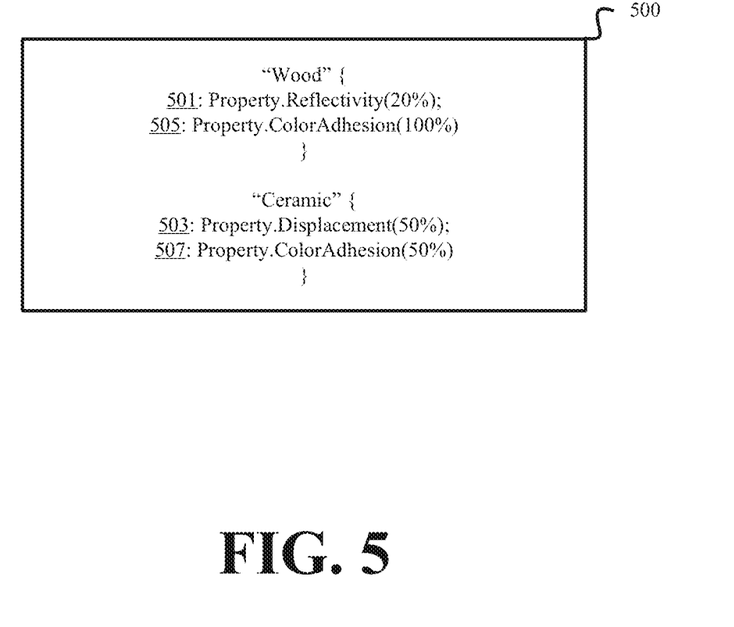
FIG. 5 illustrates an example primitive definition with primitives and rules associated with the primitives in accordance with some embodiments presented herein.

FIG. 5 illustrates an example primitive definition 500 with primitives and rules associated with the primitives in accordance with some embodiments presented herein. Primitive definition 500 may include definition of a "wood" first primitive, a "ceramic" second primitive, two rules for controlling lighting and color changes to data points defined with the first primitive, and two different rules for controlling positional and color changes to data points defined with the second primitive.

First rule 501 defined for the first primitive may specify setting the reflectivity of a data point defined with a wood material property to 20%. Accordingly, if a light source is introduced into the point cloud and/or specified for rendering the point cloud, data points defined with the first primitive will reflect 20% of the light reaching those data points because of first rule 501 associated with the first primitive in primitive definition 500. The amount of reflected light may result in an adjustment to the RGB, color values, and/or other non-positional elements of the data points defined with the first primitive.

A similar reflectivity rule may not be specified for the second primitive. Accordingly, a default value may be used for data points that are not associated with a primitive having a specified reflectivity rule. The default value may be 100% such that data points defined with the second primitive and/or without a primitive associated with a reflectivity rule may reflect 100% of the light reaching those data points because of the default value.

First rule 503 defined for the second primitive may specify adjusting the amount of positional displacement that data points defined with the second primitive experience in response to a force and/or other movement applied to the data points. In other words, first rule 503 may modify the physics that control the movement of the data points and/or the changes to the positional values of data points experiencing a force or movement. For instance, first rule 503, that is defined for the second primitive, may specify a 50% displacement such that the positional change to a data point defined with the second primitive is determined based on half of the applied force being transferred onto the data point.

Second rule 505 defined for the first primitive and second rule 507 defined for the second primitive may specify different amounts of color that are absorbed by data points defined as wood or ceramic. Specifically, second rule 505 and 507 for each primitive may specify a different amount by which the current RGB color values of the data points are impacted when a spray paint, paintbrush, or other tool is used to change the color of the data points defined with the first primitive or with the second primitive. Second rule 505 defined for the first primitive (e.g., the wood material) may specify 100% color absorption such that the color values of the data points defined with the first primitive may be replaced with whatever color values are specified for the tool used to adjust the coloring. Second rule 507 defined for the second primitive (e.g., the ceramic material) may specify 50% color absorption such that the color values of the data points defined with the second primitive may be adjusted to a median or average value of the current color values and the color values selected for the color adjustment tool. In some embodiments, second rule 507 may be repeatedly applied based on the duration with which a spray paint tool is applied to the data points defined with the second primitive. For example, every second the spray paint tool is applied, another 50% change is applied to the color values of the data points defined with the second primitive.

In some embodiments, the rules may be specified with conditions that determine which of a set of rules applies in response to a particular change. For instance, a material may be defined as a primitive with a first rule that specifies 100% reflectivity when a particular data point with that primitive receives a first amount of light, and with a second rule that specifies 50% reflectivity when the particular data point receives a second amount of light.

In some embodiments, the addition of the primitives to the elements of the point cloud data points may produce realistic changeable lighting effects that are impossible to produce from images or point clouds that do not specify the different materials or material properties for the surfaces, features, or articles in the image or point cloud and/or that do not include rules relating to how the surfaces, features, or articles react to changing lighting conditions. For instance, an image of an object that is taken during the day cannot be realistically relit to render the object at night or with dimmed lighting. Most editing applications simply perform an equal or gradient reduction in the brightness or color values of all pixels or points in the image without accounting for the different amounts of light that each surface, feature, or article of the object may reflect. In other words, the editing applications do not account for the material properties of each pixel or point when determining how to light or render those pixels or points.

Figure 6:
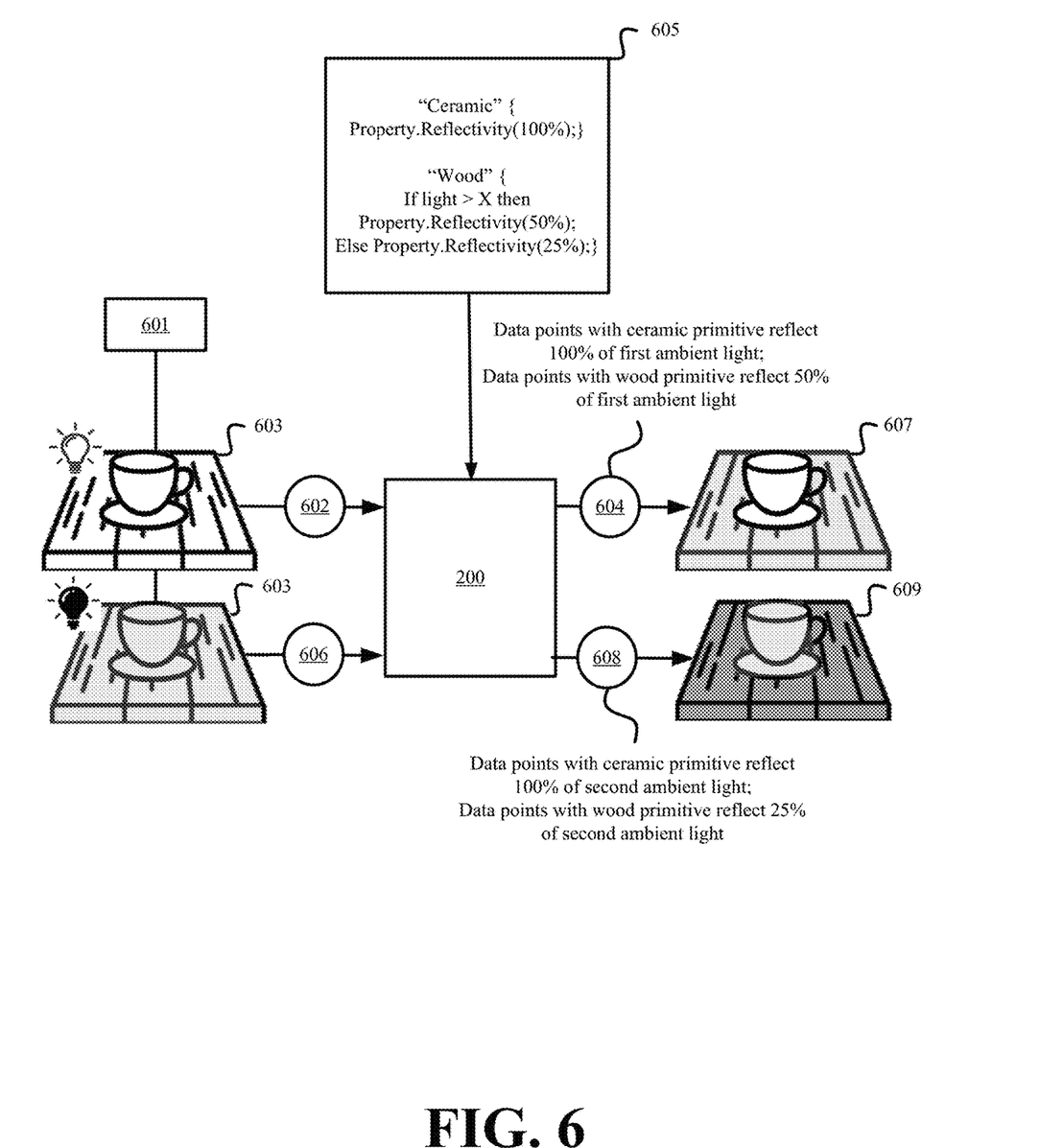
FIG. 6 illustrates an example of generating realistic lighting effects for a point cloud that is defined with primitives and primitive rules in accordance with some embodiments presented herein.

FIG. 6 illustrates an example of generating realistic lighting effects for a point cloud that is defined with primitives and primitive rules in accordance with some embodiments presented herein. Editing tool 601 may be used to insert (at 602) a first ambient light into point cloud 603. The first ambient light may shine or emit a first amount of light equally to all data points of point cloud 603.

Point cloud system 200 may adjust the lighting of the data points based on the primitives and associated rules specified within primitive definition 605. Specifically, point cloud 603 may include a first set of data points defined with a first primitive, and a second set of data points defined with a second primitive. The first set of data points may represent a cup, and may be defined with a "ceramic" primitive to identify the material of the first set of data points. The second set of data points may represent a table on which the cup rests, and may be defined with a "wood" primitive to identify the different material of the second set of data points. The first primitive may be associated with a single reflectivity rule that specifies 100% reflectivity for the data points with the ceramic primitive. The second primitive may be associated with a first reflectivity rule that specifies 50% reflectivity for a first amount of light, and a second reflectivity rule that specifies 25% reflectivity for a second amount of light.

Point cloud system 200 may apply the first ambient light to the data points, and may adjust the affect that the light has on the data points for the different materials (e.g., the first set of data points defined with the first primitive and the second set of data points defined with the second primitive) based on the different reflectivity rules specified for each primitive in primitive definition 605. For instance, the first set of data points may reflect the full first amount of light from the first ambient light source in response to the reflectivity rule associated with the ceramic material specifying 100% reflectivity. The second set of data points may reflect half of the first amount of light in response to the light from the first ambient light source satisfying the condition of the first reflectivity rule associated with the wood material. Point cloud system 200 may generate (at 604) first visualization or image 607 for point cloud 603 with the impact of the first ambient light source on the first set of data points of the ceramic material being different than the impact of the first ambient light source on the second set of data points of the wood material.

The first ambient light source may be swapped with a second ambient light source that produces a second amount of light that is half as bright as the first amount of light. Point cloud system 200 may receive (at 606) point cloud 603 with the second ambient light source in place of the first light source.

Rather than dim or reduce the brightness of the point cloud data points from first visualization or image 607 by half in response to the half reduction in light, point cloud system 200 may apply the second ambient light to the data points, and may adjust the affect that the light has on the data points based on the different reflectivity rules specified for each primitive in primitive definition 605. Accordingly, point cloud system 200 may generate (at 608) second visualization or image 609 for point cloud 603 with the first set of data points reflecting 100% of the second amount of light from the second ambient light source, and with the second set of data points reflecting 25% of the second amount of light from the second ambient light source in response to the light from the second ambient light source satisfying the condition of the second lighting rule associated with the wood material.

In some embodiments, the primitives may be used to establish non-geometric bonds between different sets of data points. The non-geometric bonds may simplify the editing or adjusting of the data points by applying the same edit or adjustment to all data points that are bonded at one time, and without having to search the point cloud for each data point that is defined with a particular primitive every time an edit or an adjustment is made.

Figure 7:
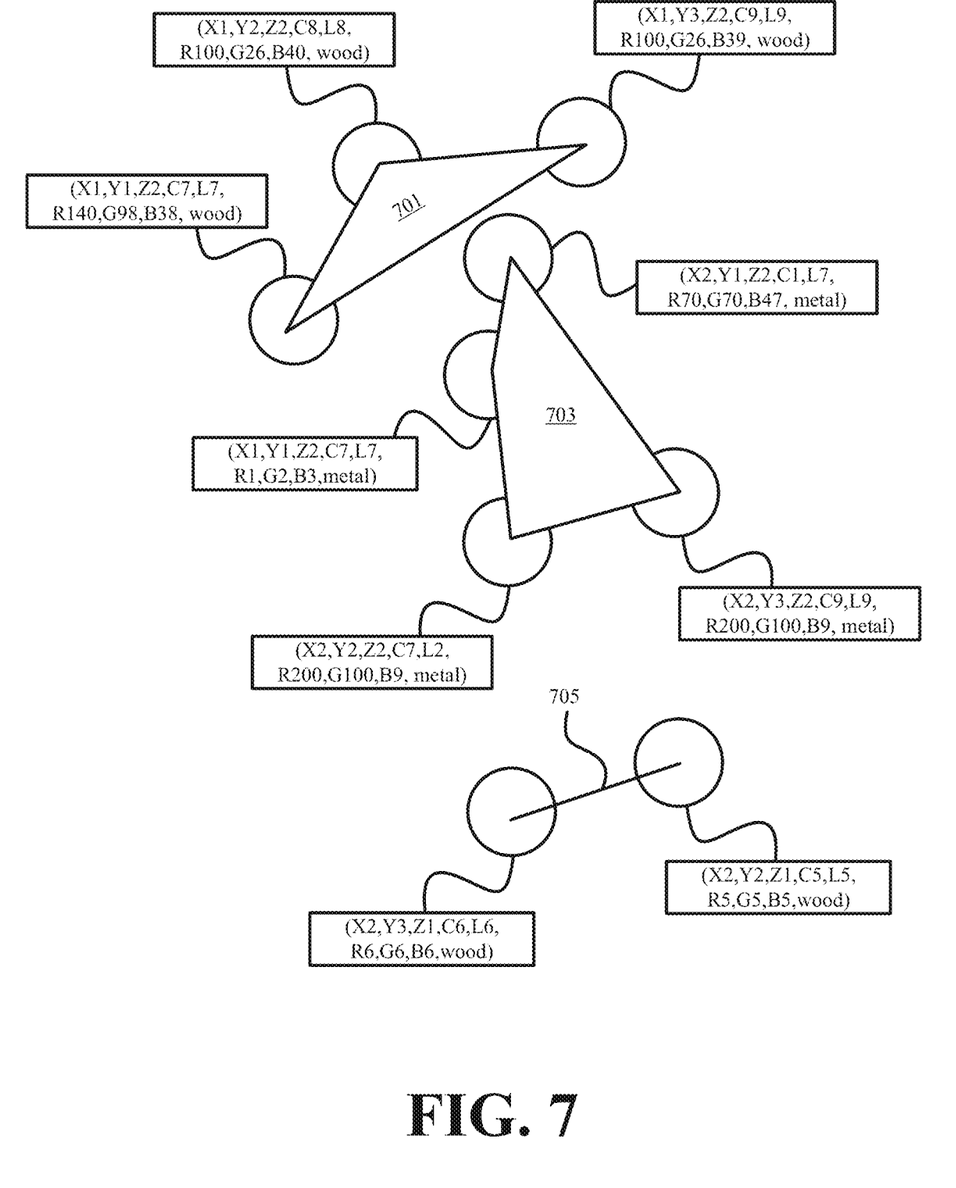
FIG. 7 illustrates an example of creating non-geometric bonds between data points of a point cloud using primitives in accordance with some embodiments presented herein.

FIG. 7 illustrates an example of creating non-geometric bonds between data points of a point cloud using primitives in accordance with some embodiments presented herein. To establish the bonds, point cloud system 200 may scan the point cloud data points to identify different sets of data points that are defined with a common primitive or material.

In some embodiments, point cloud system 200 may establish a bond between a set of data points that are defined with the same primitive. In some embodiments, point cloud system 200 may restrict the bonding to data points that represent the same object. Accordingly, point cloud system 200 may establish a bond between data points that are defined with the same primitive and that have positional commonality. In other words, no bond is created between data points that have the same primitive but that are located at opposite ends of the point cloud or that fail to satisfy other positional criteria.

In some embodiments, the positional commonality may be satisfied when the distance between the two closest data points defined with a common primitive is less than a threshold distance. In some embodiments, the positional commonality may be satisfied when two data points defined with a common primitive are not separated by another data point that is defined with a different or no primitive. As shown in FIG. 7, point cloud system 200 may establish first bond 701 between a first set of neighboring data points that are defined with a first primitive (e.g., "wood"), second bond 703 between a second set of neighboring data points that are defined with a second primitive (e.g., "metal"), and third bond 705 between a third set of neighboring data points that are defined with the first primitive and that are separated from the first set of neighboring data points by one or more of the second set of neighboring data points.

In some embodiments, establishing a bond may include linking the data points from a bonded set together so that the entire set of bonded data points may be selected in response in to the selection of any one data point from that set. Linking the set of bonded data points may include storing identifiers for the set in an array or adding pointers to connect one data point in the sets to at least one other data point.

Point cloud system 200 may use the established bonds to differentiate between different objects in the same point cloud and/or to allow for the precision extraction, editing, repositioning, and/or other manipulation of each object. Accordingly, the bonds created between data points of the same material may be used to achieve a green-screen or chroma-key effect in which different objects may be precisely added to, removed from, or edited within a scene without affecting other objects.

Figure 8:
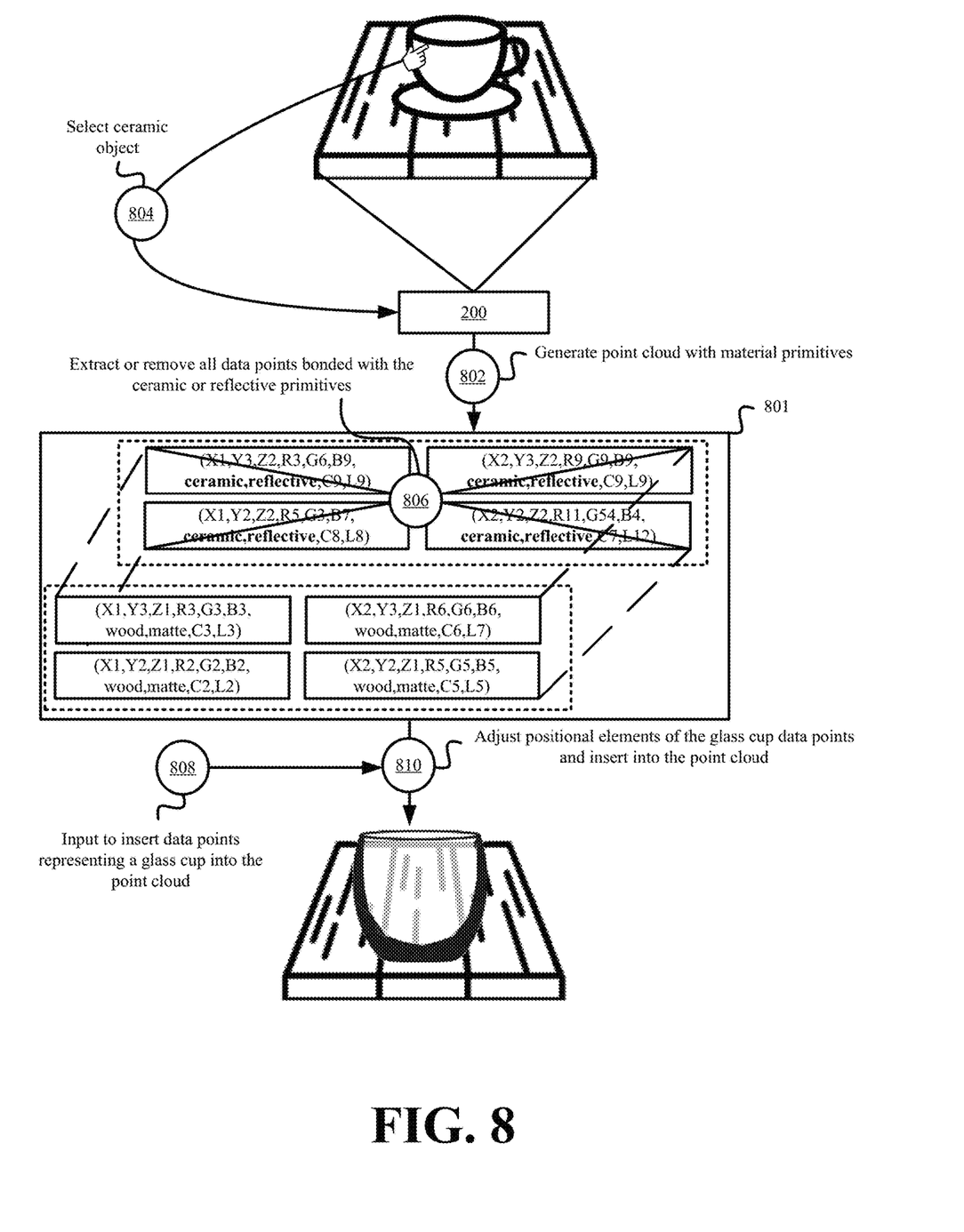
FIG. 8 illustrates an example of object manipulation based on non-geometric bonding of point cloud data points in accordance with some embodiments presented herein.

FIG. 8 illustrates an example of object manipulation based on non-geometric bonding of point cloud data points in accordance with some embodiments presented herein. Point cloud system 200 may receive and/or generate (at 802) point cloud 801 that is a 3D capture of a ceramic cup placed atop a wooden table. The point cloud data points representing the cup may be defined with a "ceramic" primitive, a "reflective" primitive, and values other positional and non-positional elements, and the point cloud data points representing the table may be defined with a "wood" primitive, a "matte" primitive, and values for other positional and non-positional elements.

In some embodiments, the primitives may be defined when generating (at 802) point cloud 801 and scanning the environment with a spectral imaging device. In some embodiments, the primitives may be automatically defined using AI/ML based on the positional and non-positional values captured for the first set of data points being within ranges modeled by the AI/ML for ceramic and/or reflective objects, and the positional and non-positional values captured for the second set of data points being within ranges modeled by the AI/ML for wooden and/or matte objects. In some embodiments, the primitive definition may map the ceramic and/or reflective primitives to two or more positional and non-positional values of the first set data points, and may map the wood and matte primitives to two or more positional and non-positional values of the second set data points. In some embodiments, the primitives may be manually assigned to the data points based on a user selection of the different set of data points.

Point cloud system 200 may receive (at 804) input for editing the point cloud. In some embodiments, the input may include selection of at least one data point in the first set of data points. Point cloud system 200 may determine that the selected data point is linked to the first set of data points based on the bond established on the ceramic and/or reflective primitives. In some embodiments, the input may include one or more of the ceramic or reflective primitives, and point cloud system 200 may search point cloud 801 to select the first set of data points that are bonded based on the identified primitive.

The input may further specify removing the first set of data points from point cloud 801 or extracting the ceramic or reflective object represented by the first set of data points in point cloud 801. Since the data points are bonded based on a common material property, point cloud system 200 may precisely remove (at 806) all data points representing the ceramic and reflective cup from point cloud 801 without leaving any artifacts or other data points of the cup in point cloud 801.

Point cloud system 200 may receive (at 808) additional input for inserting a third set of data points that include a "glass" primitive and that represent a glass cup into point cloud 801 in place of the ceramic cup that was represented by the first set of data points. Point cloud system 200 may insert (at 810) the glass cup into point cloud 801 by adjusting the positional elements of the third set of data points to be within the range of the positional elements from the extracted first set of data points.

The common primitive associated with the third set of data points and the difference between the glass primitive defined for the third set of data points and the wood primitive defined for the second set of data points allows point cloud system 200 to perform other modifications accurately to the data points of one object without impacting the data points of the other object. For instance, point cloud system 200 may adjust the coloring, sizing, positioning, and/or other positional or non-positional elements of the second set of data points representing the wood table without adjusting any elements of the third set of data points representing the glass cup by applying the adjustment to data points that are bonded with the glass primitive.

Figure 9:
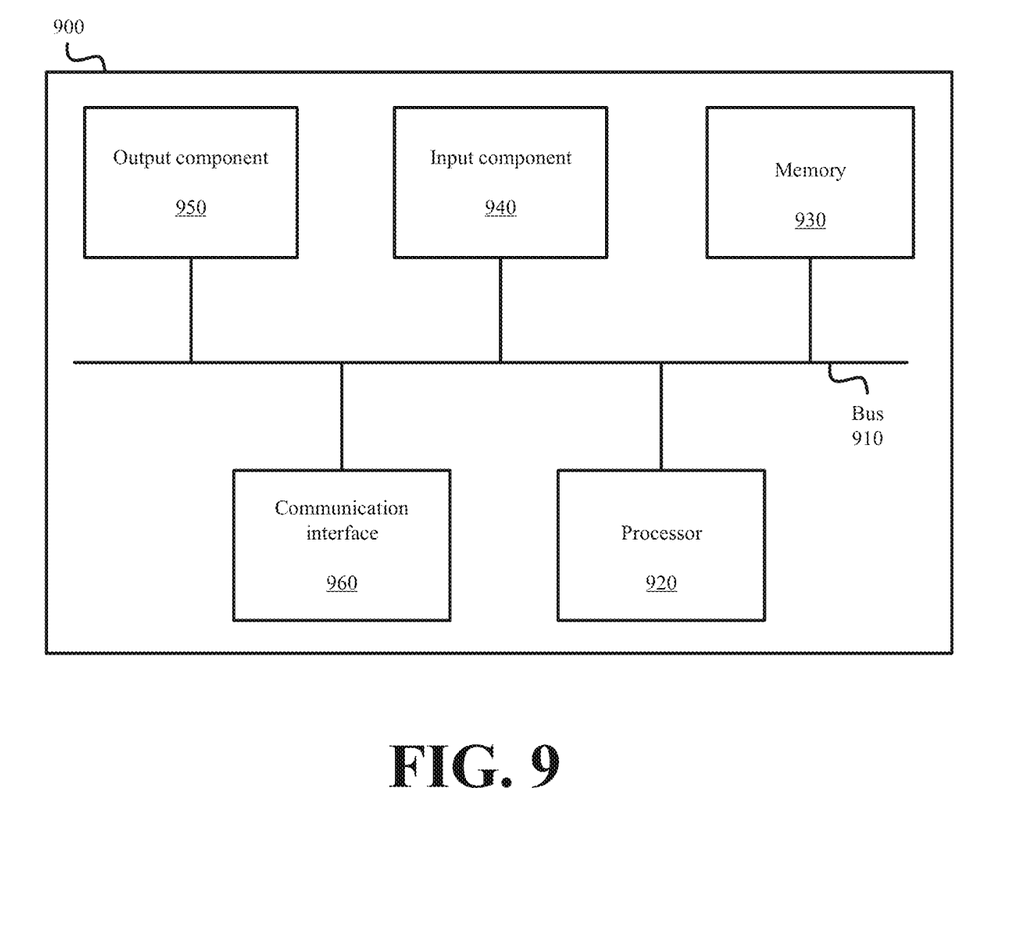
FIG. 9 illustrates example components of one or more devices, according to one or more embodiments described herein.

FIG. 9 is a diagram of example components of device 900. Device 900 may be used to implement one or more of the devices or systems described above (e.g., point cloud system 200, imaging devices, input devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:

receiving, at a system comprising one or more hardware processors, a plurality of point clouds, each point cloud of the plurality of point clouds comprising different sets of data points that produce a visualization of a particular material, wherein each individual data point of the different sets of data points comprises a plurality of elements that define (i) a particular position of the individual data point in a three-dimensional ("3D") space, and (ii) colors of the individual data point;

determining, by execution of the one or more hardware processors, a commonality amongst two or more positional or color values defined for a set of two or more elements from the plurality of elements of the different sets of data points;

mapping, by execution of the one or more hardware processors, the commonality to a primitive;

receiving, at the system, an unclassified point cloud comprising a plurality of data points, wherein each data point of the plurality data points comprises the plurality of elements;

classifying, by execution of the one or more hardware processors, a particular set of data points from the plurality of data points with the primitive based on two or more positional or color values defined for the set of two or more elements of the particular set of data points comprising the commonality; and bonding, by execution of the one or more hardware processors, the particular set of data points in the unclassified point cloud, wherein bonding the particular set of data points comprises collectively selecting or editing the particular set of data points in response to a request that implicates at least one data point classified with the primitive.

2. The method of claim 1, wherein determining the commonality comprises:

identifying at least one of a common structure from values of a first set of the plurality of elements that define the particular positions of the different sets of data points, a common color pattern from values of a second set of the plurality of elements that define the colors of the different sets of data points, and a common color range from values of a third set of the plurality of elements that define the colors of the different sets of data points.

3. The method of claim 1 further comprising:

compressing the unclassified point cloud by replacing values defined for the set of two or more elements of the particular set of data points with the primitive.

4. The method of claim 1 further comprising:

adding the primitive as a new element of the plurality of elements to the particular set of data points.

5. The method of claim 1 further comprising:

editing the particular set of data points differently than a subset of the plurality of data points that neighbor the particular set of data points in response to an edit and an application of the edit differing for the particular set of data points that are classified with the primitive and the subset of data points that are not classified with the primitive.

6. The method of claim 1 further comprising:
receiving a selection of a region that encompasses the particular set of data points and a different subset of the plurality of data points that are not classified with the primitive; and
adjusting the selection by retaining the particular set of data points and by removing the subset of data points from the selection.

7. The method of claim 1 further comprising:
identifying a selection of a particular data point that is classified with the primitive;
detecting other data points in the unclassified point cloud that are classified with the primitive; and
expanding the selection to include the particular set of data points in response to said detecting and the particular set of data points being classified with the primitive.

8. The method of claim 1 further comprising:
receiving a user input for adjusting one or more elements of data points classified with the primitive;
selecting the particular set of data points that are classified with the primitive; and
adjusting the one or more elements of the particular set of data points in response to the user input.

9. The method of claim 1 further comprising:
receiving a request to search for data points that are classified with the primitive; and
presenting the particular set of data points that are classified with the primitive in response to the request.

10. The method of claim 1 further comprising:
receiving a request to search for surfaces, features, or articles of an imaged object with the particular material; and
selecting the particular set of data points that are classified with the primitive in response to the request.

11. The method of claim 1 further comprising:
defining one or more rules for the primitive;
receiving a first adjustment to at least one element of a data point from the particular set of data points; and
modifying the at least one element of the data point by a second adjustment based on the data point being classified with the primitive and the one or more rules changing the first adjustment to the second adjustment.

12. The method of claim 1, wherein classifying the particular set of data points comprises:
assigning the primitive to data points with a first range of values for a first element of the plurality of elements that corresponds to a first electromagnetic spectrum band and a second range of values for a second element of the plurality of elements that corresponds to a second electromagnetic spectrum band.

13. The method of claim 1, wherein classifying the particular set of data points comprises:
assigning the primitive to data points with a first range of red color values defined for a first element of the plurality of elements, a second range of blue color values defined for a second element of the plurality of elements, and a third range of green color values defined for a third element of the plurality of elements.

14. The method of claim 1,
wherein receiving the plurality of point clouds comprises receiving two or more classified point clouds, wherein the different sets of data points in the two or more classified point clouds are labeled with one of a first primitive and a second primitive; and
wherein determining the commonality comprises:
identifying a first unique pattern in values defined for a first set of the plurality of elements of the different sets of data points labeled with the first primitive that is not found in values defined for the first set of elements of the different sets of data points labeled with the second primitive; and
identifying a second unique pattern in values defined for a second set of the plurality of elements of the different sets of data points labeled with the second primitive that is not found in values defined for the second set of elements of the different sets of data points labeled with the first primitive.

15. A system comprising:
one or more hardware processors configured to:
receive a plurality of point clouds, each point cloud of the plurality of point clouds comprising different sets of data points that produce a visualization of a particular material, wherein each individual data point of the different sets of data points comprises a plurality of elements that define (i) a particular position of the individual data point in a three-dimensional ("3D") space, and (ii) colors of the individual data point;
determine a commonality amongst two or more positional or color values defined for a set of two or more elements from the plurality of elements of the different sets of data points;
map the commonality to a primitive;
receive an unclassified point cloud comprising a plurality of data points, wherein each data point of the plurality data points comprises the plurality of elements;
classify a particular set of data points from the plurality of data points with the primitive based on two or more positional or color values defined for the set of two or more elements of the particular set of data points comprising the commonality; and
bond the particular set of data points in the unclassified point cloud, wherein bonding the particular set of data points comprises collectively selecting or editing the particular set of data points in response to a request that implicates at least one data point classified with the primitive.

16. The system of claim 15, wherein the one or more hardware processors are further configured to:
compress the unclassified point cloud by replacing values defined for the set of two or more elements of the particular set of data points with the primitive.

17. The system of claim 15, wherein the one or more hardware processors are further configured to:
edit the particular set of data points differently than a subset of the plurality of data points that neighbor the particular set of data points in response to an edit and an application of the edit differing for the particular set of data points that are classified with the primitive and the subset of data points that are not classified with the primitive.

18. The system of claim 15, wherein the one or more hardware processors are further configured to:
receive a selection of a region that encompasses the particular set of data points and a different subset of the plurality of data points that are not classified with the primitive; and
adjust the selection by retaining the particular set of data points and by removing the subset of data points from the selection.

19. The system of claim 15, wherein the one or more hardware processors are further configured to:
- identify a selection of a particular data point that is classified with the primitive;
- detect other data points in the unclassified point cloud that are classified with the primitive; and
- expand the selection to include the particular set of data points in response to said detecting and the particular set of data points being classified with the primitive.

20. A non-transitory computer-readable medium storing program instructions that, when executed by one or more hardware processors of a point cloud system, cause the point cloud system to perform operations comprising:
- receive a plurality of point clouds, each point cloud of the plurality of point clouds comprising different sets of data points that produce a visualization of a particular material, wherein each individual data point of the different sets of data points comprises a plurality of elements that define (i) a particular position of the individual data point in a three-dimensional ("3D") space, and (ii) colors of the individual data point;
- determine a commonality amongst two or more positional or color values defined for a set of two or more elements from the plurality of elements of the different sets of data points;
- map the commonality to a primitive;
- receive an unclassified point cloud comprising a plurality of data points, wherein each data point of the plurality data points comprises the plurality of elements;
- classify a particular set of data points from the plurality of data points with the primitive based on two or more positional or color values defined for the set of two or more elements of the particular set of data points comprising the commonality; and
- bond the particular set of data points in the unclassified point cloud, wherein bonding the particular set of data points comprises collectively selecting or editing the particular set of data points in response to a request that implicates at least one data point classified with the primitive.

* * * * *